March 17, 1959   W. C. MOELLER   2,877,462
GOGGLE ASSEMBLY
Filed July 11, 1955
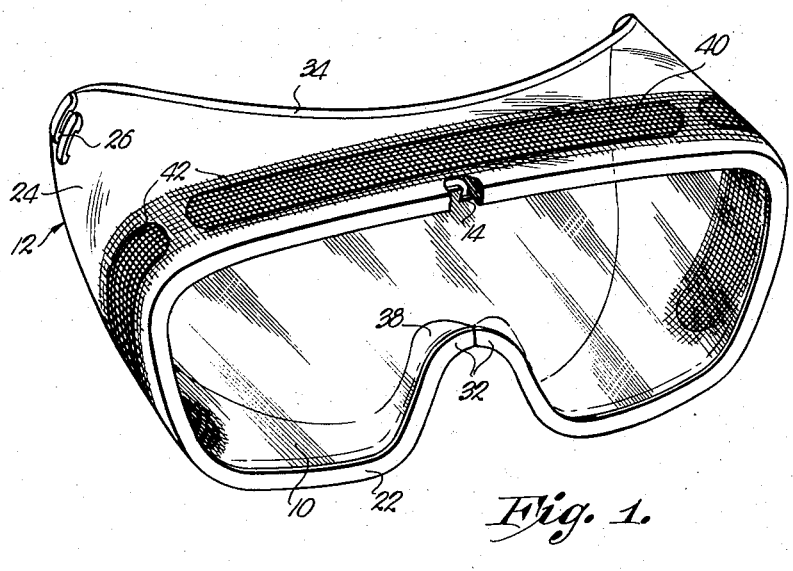
Fig. 1.
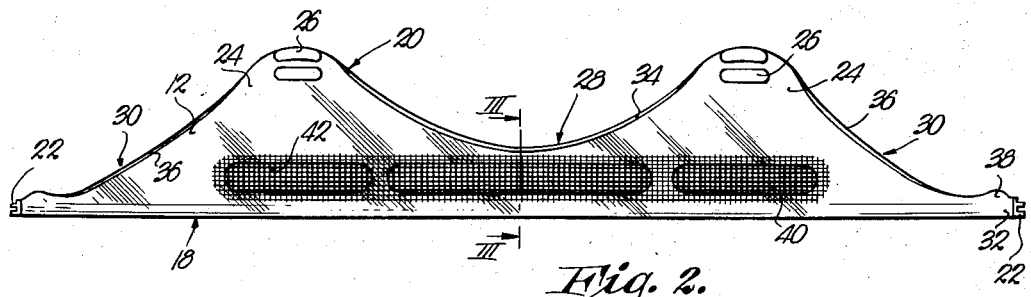
Fig. 2.
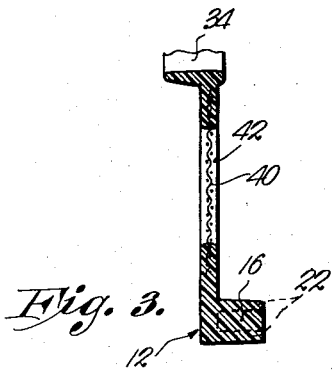
Fig. 3.
INVENTOR.
William C. Moeller
BY
ATTORNEY.

United States Patent Office 2,877,462
Patented Mar. 17, 1959

2,877,462

GOGGLE ASSEMBLY

William C. Moeller, Kansas City, Mo., assignor to Parmelee Plastics Company, Kansas City, Mo., a corporation of Missouri Application July 11, 1955, Serial No. 521,212

6 Claims. (Cl. 2—14)

This invention relates to goggles designed to protect the eyes of the wearer against dust, dirt and flying objects, the primary object being to provide a novel frame adapted to be wrapped around a transparent eye shield and when mounted thereon, to conform to the face of the wearer around the eyes and across the nose, forehead, cheeks and temples.

The most important object of the present invention is to provide an eye shield frame that may be produced from an initially flat blank of flexible, relatively soft, pliable material and including a reinforcement cooperable with the relatively stiff, transparent shield in maintaining the shape of the frame so that the same will fit snugly, yet comfortably, against the wearer's face.

Another object of the instant invention is to provide a frame having as a part thereof, longitudinal flanges for receiving the peripheral edge of the eye shield, a laterally extending band for engagement with the forehead of the wearer, marginal projections or lobes for engagement with the temples and adapted to receive an elastic strap or the like for attachment of the goggles, and arcuate strips for engagement with the cheeks of the wearer, together with soft, pliable nose pads adjacent the ends of the blank.

A further object of the present invention is to provide ventilating slots in the frame and to utilize the aforementioned reinforcement, by virtue of its foraminous nature, as a cover for such slots.

In the drawing:

Figure 1 is a front perspective view of a goggle assembly made pursuant to my present invention.

Fig. 2 is a plan view of the outermost face of the shield-encircling frame of Fig. 1, showing the same in a flat condition; and Fig. 3 is an enlarged, fragmentary, cross-sectional view taken on line III—III of Fig. 2.

Eye shield 10 around which a novel frame 12, forming the subject matter of the instant invention is wrapped, may be much in the nature of that disclosed in my Patents 2,513,507, dated July 4, 1950, and 2,582,345, dated January 15, 1952, and 2,625,685, dated January 20, 1953, in that the same is made from a suitable, relatively stiff, transparent material such as a lightweight, resilient plastic. While the shield 10 does not take the form of a pair of corrected lenses, it is preferably arched both longitudinally and transversely to avoid distortion when placed in use in accordance with the teachings of my Patent No. 2,617,100, dated November 11, 1952.

Shield 10 is provided with a nose-receiving notch of virtually the same characteristics as that disclosed in said Patent No. 2,625,685, together with a plurality of peripheral notches 14 adapted to receive and interlocked complementally with wedge-shaped ribs 16 on the frame 12 when the latter is wrapped around the periphery of the shield 10 as shown in Fig. 1.

Frame 12 is in the nature of an elongated, initially flat blank of flexible, relatively soft, pliable material such as plastic, as shown in Fig. 2 of the drawing. The blank is contoured to conform to the face of the wearer not only around the eyes and across the nose, but across the forehead, cheeks and temples. To this end, the blank is provided with a straight, longitudinal edge 18 and a sinuous, longitudinal edge 20. The innermost face of the blank has a pair of spaced, longitudinally-extending flanges 22 adjacent the edge 18 thereof which embrace the opposed margins of the shield 10 at its outermost periphery when the frame 12 is mounted in place. The wedges 16 are spaced along the flanges 22 therebetween and formed integrally therewith.

A pair of relatively large, convex temple-engaging marginal projections or lobes 24, are provided with loops 26 on the outermost faces thereof for receiving an elastic strap or the like in much the same manner as shown in said Patent No. 2,625,685.

The sinuous edge 20 has a relatively deep, centrally disposed, concave stretch 28 between the lobes 24, together with a pair of secondary concave stretches 30 that are relatively shallow and extend outwardly from the lobes 24 to the relatively narrow ends 32 of the blank, it being noted that the stretches 30 and the longitudinal edge 18 converge relatively as the ends 32 are approached.

A transversely flat, longitudinally arcuate band 34 integral with the stretch 28 of edge 20, is adapted to conform to and engage the forehead of the wearer when the goggle assembly is placed in use, it being noted that the band 34 extends from both the innermost and outermost faces of the blank. The stretches 30 are likewise provided with cheek-engaging strips 36 that are integral therewith and extend laterally beyond the outermost face of the blank. The strips 36 are preferably flat transversely thereof, but longitudinally convex in conformity with the configuration of the corresponding stretches 30.

Stretches 30 terminate in, and merge with relatively small convex nose pads 38 on the edge 20, and also arched longitudinally inwardly so as to conform with the shape of the nose.

To the end that soft, pliable and, therefore, comfortable material may be used in producing the frame 12, and so that the same may be readily and easily wrapped around the peripheral edge of the shield 10, it is reinforced with an elongated element 40 extending longitudinally of the blank between the band 34 and the flanges 22, as well as between the flanges 22 and the strips 36. The blank is provided with a plurality of ventilating slots 42 and, therefore, the element 40 is made from relatively stiff, bendable foraminous material such as screen wire and bridged across the slots 42.

It is seen therefore, that when the frame 12 is placed upon the shield 10, the reinforcement 40 can be easily formed into the desired shape and will not only cooperate with the shield 10 in maintaining the desired form in the frame 12, but will serve to prevent entrance of large particles of foreign matter through the ventilating slots 42.

It is to be pointed out that a frame of the aforedescribed character is to be preferred to those of the above-mentioned prior art in that the same may be more easily and less expensively manufactured. The equipment needed to produce a molded frame is not only costly, but presents many maintenance problems, whereas the blank shown in Fig. 2 of the drawing may be easily and quickly produced without need for complicated molding apparatus.

Having thus described the invention what is claimed as new and desired to be secured by Letters Patent is:

1. In a goggle, an eye-protecting shield of relatively stiff, transparent material having a desirably formed peripheral edge and provided with a nose-clearing notch; an elongated frame having a normally innermost and an outermost longitudinal edge and a pair of ends, said frame being wrapped around the peripheral edge of said shield in substantial circumscribing relationship thereto adjacent said outermost edge of the frame; releasable means attaching the frame to the shield, said innermost edge of the frame conforming to the contour of the face of the wearer around the eyes and across the bridge of the nose, said frame including an initially flat blank of flexible, relatively soft, pliable material incapable of maintaining the contour of said peripheral edge of the shield when the frame is removed from the shield; and a longitudinally extending element of bendable, self-sustaining material extending continuously along a major portion of the length of the frame and secured to the latter between said edges thereof, said element being of sufficient length and width relative to the corresponding dimensions of the frame to hold the innermost edge of the frame contoured in conformity with the shape of the face of the wearer and cooperable with said shield in holdin the outermost edge of the frame contoured in conformity with the configuration of said edge of the shield.

2. In a goggle, an eye-protecting shield of relatively stiff, transparent material having a desirably formed peripheral edge and provided with a nose-clearing notch; an elongated frame having a normally innermost and an outermost longitudinal edge and a pair of ends, said frame having a ventilating opening provided therein and being wrapped around the peripheral edge of said shield in substantial circumscribing relationship thereto adjacent said outermost edge of the frame; releasable means attaching the frame to the shield, said innermost edge of the frame conforming to the contour of the face of the wearer around the eyes and across the bridge of the nose, said frame including an initially flat blank of flexible, relatively soft, pliable material incapable of maintaining the contour of said peripheral edge of the shield when the frame is removed from the shield; and a longitudinally extending foraminous element of bendable, self-sustaining material extending continuously along a major portion of the length of the frame and secured to the latter between said edges thereof across said opening, said element being of sufficient length and width relative to the corresponding dimensions of the frame to hold the innermost edge of the frame contoured in conformity with the shape of said face of the wearer, and cooperable with said shield in holding said outermost edge of the frame contoured in conformity with the configuration of said edge of the shield.

3. In a goggle, an eye-protecting shield of relatively stiff, transparent material having a desirably formed peripheral edge and provided with a nose-clearing notch; an elongated frame having an innermost and an outermost longitudinal edge and a pair of ends, said frame having a longitudinal row of elongated slots and being wrapped around the peripheral edge of said shield in substantial circumscribing relationship thereto adjacent said outermost edge of the frame; releasable means attaching the frame to the shield, said innermost edge of the frame conforming to the contour of the face of the wearer around the eyes and across the bridge of the nose, said frame including an initially flat blank of flexible, relatively soft, pliable material incapable of maintaining the contour of said peripheral edge of the shield when the frame is removed from the shield; and an elongated, longitudinally extending screen wire extending continuously along a major portion of the length of the frame and secured to the latter between said edges thereof across said slots, said element being of sufficient length and width relative to the corresponding dimensions of the frame to hold the innermost edge of the frame contoured in conformity with the shape of said face of the wearer, and cooperable with said shield in holding said outermost edge of the frame contoured in conformity with the configuration of said edge of the shield.

4. In a goggle, an eye-protecting shield of relatively stiff, transparent material having a desirably formed peripheral edge and provided with a nose-clearing notch; an elongated frame having an innermost and an outermost longitudinal edge and a pair of ends, said frame having a row of elongated slots extending longitudinally thereof throughout substantially its entire length and being wrapped around the peripheral edge of said shield in substantially complete circumscribing relationship thereto adjacent said outermost edge of the frame; releasable means attaching the frame to the shield, said innermost edge of the frame conforming to the contour of the face of the wearer around the eyes and across the bridge of the nose, said frame including an initially flat blank of flexible, relatively soft, pliable material incapable of maintaining the contour of said peripheral edge of the shield when the frame is removed from the shield; and an elongated, longitudinally extending screen wire element extending continuously along a major portion of the length of the frame and embedded within the latter between said edges thereof across said slots, said element being of sufficient length and width relative to the corresponding dimensions of the frame to hold the innermost edge of the frame contoured in conformity with the shape of said face of the wearer, and cooperable with said shield in holding said outermost edge of the frame contoured in conformity with the configuration of said edge of the shield.

5. In a goggle, an eye-protecting shield of relatively stiff, transparent material having a desirably formed peripheral edge and provided with a nose-clearing notch; an elongated frame having an innermost and an outermost longitudinal edge, a pair of ends, and a pair of nose pads extending laterally from said innermost edge adjacent said ends, said frame being wrapped around the peripheral edge of said shield in complete circumscribing relationship thereto adjacent said outermost edge of the frame; releasable means attaching the frame to the shield, said innermost edge of the frame conforming to the contour of the face of the wearer around the eyes and across the bridge of the nose, said ends of the frame being in abutting relationship between said nose pads at said bridge of the nose, said frame including an initially flat blank of flexible, relatively soft, pliable material incapable of maintaining the contour of said peripheral edge of the shield when the frame is removed from the shield; and a longitudinally extending element of bendable, self-sustaining material extending continuously along a major portion of the length of the frame and secured to the latter between said edges thereof, said element being sufficient in length and width relative to the corresponding dimensions of the frame to hold the innermost edge of the frame contoured in conformity with the shape of said face of the wearer, and cooperable with said shield in holding said outermost edge of the frame contoured in conformity with the configuration of said edge of the shield.

6. In a goggle, an eye-protecting shield of relatively stiff, transparent material having a desirably formed peripheral edge and provided with a nose-clearing notch; an elongated frame having an innermost and an outermost longitudinal edge, a pair of ends, and a pair of nose pads extending laterally from said innermost edge adjacent said ends, said frame being wrapped around the peripheral edge of said shield in complete circumscribing relationship thereto adjacent said outermost edge of the frame, one face of said frame having a pair of spaced flanges on one face thereof embracing the opposed margins of the shield, said flanges being adjacent said outermost edge of the frame and coextensive in length therewith, presenting a channel having an imperforate bottom; releasable means attaching the frame to the shield, said innermost edge of the frame conforming to the contour of the face of the wearer around the eyes and across the bridge of the nose, said ends of the frame being in abutting relationship between said nose pads at said bridge of the nose, said frame including an initially flat blank of flexible, relatively soft, pliable material incapable of maintaining the contour of said peripheral edge of the shield when the frame is removed from the shield; and a longitudinally extending element of bendable, self-sustaining material extending continuously along a major portion of the length of the frame and secured to the latter between said edges thereof, said element being of sufficient length and width relative to the corresponding dimensions of the frame to hold the innermost edge of the frame contoured in conformity with the shape of said face of the wearer, and cooperable with said shield in holding said outermost edge of the frame contoured in conformity with the configuration of said edge of the shield.

References Cited in the file of this patent

UNITED STATES PATENTS

| | | |
|---|---|---|
| 2,368,750 | Du Bois | Feb. 6, 1945 |
| 2,391,349 | Ring | Dec. 18, 1945 |
| 2,422,534 | Du Bois | June 17, 1947 |
| 2,706,815 | Parmelee | Apr. 26, 1955 |